Patented July 26, 1938

2,124,971

UNITED STATES PATENT OFFICE 2,124,971

LIQUID DENTIFRICE

Harry Eisenberg and Anthony J. Zolenas, Jr., Baltimore, Md.

No Drawing. Application August 3, 1936, Serial No. 94,056

7 Claims. (Cl. 167—93)

The present invention relates in general to a new and improved composition of matter primarily adapted for the cleaning and hygeia of teeth, and more particularly to the provision of a new and improved liquid dentifrice, preferably in the form of a liquid having a specific gravity within a range of from 1.00 to 1.500.

Objects of the invention are the provision of a liquid dentifrice comprising as the essential cleaning ingredient a neutral soap, preferably a neutral vegetable soap, and essentially an ingredient, as the principal solvent of the soap, which is neither hygroscopic in use with respect to natural moisture in the tissues of the oral cavity and therefore is not injurious even to a limited extent, like glycerine may be, to the gum tissues, nor alcoholic in characteristics but rather weakly alkaline in reaction so that the dentifrice will not precipitate albuminous material like protoplasm in the living cells in the use of the dentifrice, as may occur with alcoholic solvents for the dentifrice soaps; the provision of a dentifrice as aforesaid which while containing the soap in stable solution will also hold other dentifrice constituents stably in solution, such as an antiseptic, a bleach, flavor, and coloring for attractiveness; the provision of a dentifrice as aforesaid but which contains no abrasives, gums or starches, so that in use tooth enamel is not removed along with the so-called tartar and other debris residing between the gingival margin and the teeth, or between the teeth themselves, and no vegetable gum or starch may remain or lodge in crevices where they may breed bacteria in the same manner as food debris; the provision of a solute material essentially as the principal solvent which will greatly lower the surface tension of any aqueous medium present during the use of the dentifrice, thus aiding the dentifrice to reach and work into every part of the oral cavity; and the invention has for further objects such other improvements and advantages as may be found to obtain in the composition and method hereinafter described or claimed.

In its presently described embodiment, the invention is incorporated in a liquid dentifrice comprising the usual range of ingredients having established medicinal and dental acceptance. For convenience, the present description will be confined to this use of the invention; features of the invention are, however, capable of other valuable application, for example, paste dentifrices or dentifrices that may or may not contain all the described ingredients; consequently the scope of the invention is not confined to the specific use and specific embodiment herein described as an illustrative example.

We have found that a stable semi-viscous saponaceous solution, hydro-glycolic in character, and especially a solvent selected from the group consisting of 1,2-propanediol
1,3-propanediol
1,2-butanediol
1,3-butanediol
2,3-butanediol
1,4-butanediol
1,2-ethanediol (ethylene glycol)
2-methyl-1,3-propanediol and more particularly propanediol, otherwise known as propylene glycol, have equivalent and unusual properties with respect to dentifrices, and more particularly liquid dentifrices. Hydroglycols, aforesaid, and especially the propanediols like propylene glycol, have an established medicinal and dental acceptance as a chemical harmless to any mucous membrane. We have found that the "diols" aforesaid form a stable solution of the usually acceptable dentifrice ingredients. Former soap solutions deposit palmitin or other like substances upon standing any period of time. We have found that each of the "diols", and more particularly 1,2-propanediol, acts as a solvent for neutral vegetable soap cleaning elements in dentifrices, and acts as a stabilizer for the dentifrice. The aforesaid glycols, and more particularly 1,2-propanediol, also have the property of lowering the surface tension of any aqueous material, thus enabling the dentifrice to work into every part of the oral cavity. A liquid dentifrice results which is non-alcoholic in action and therefore precipitates no albuminous material, and contains no glycerine. The dentifrice is not hygroscopic and consequently does not injuriously remove water from the tissues in use.

The dentifrice of the present invention comprises a neutral vegetable soap solution like castile soap in a 50% hydro-glycolic medium containing 1 to 5% certain beneficial oils which act as stimulants to the oral cavity. Such oils are oil peppermint, oil spearmint, oil anise, methyl salicylate, eucalyptol, safrol, and oil of cloves. It also comprises the usual mild bleach, antiseptic, flavor, tint and an ingredient for viscosity.

The dentifrice is of such character that the soap content can be suitably varied from 5% to 15%, but 12% is preferred. The content of the "diols", and 1,2-propanediol in particular, is preferably used in concentrations of 50% but any of them can be used in concentrations of from 5% to 95%. That is, the dentifrice may comprise 5% soap and 95% of the diols, 10%–15% soap to 90%–85% of the diols, without any of the other usual dentifrice ingredients; or percentages of the soap and diols less than the total solution but with other usual dentifrice ingredients and carrier such as water, in proportions to make 100%. The "diols" as used may be either one or a mixture of any of the above-mentioned glycols in precentages of from 5% to 95% of the finished product. Sodium stearate is preferred for increasing the viscosity and may vary from 0.1% to 2%. Any well known antiseptic that definitely promotes asepsis may be employed, but thymol and especially chlorthymol is preferred in amounts ranging from 0.05–0.2 per cent.

As a mold tooth bleach, an alkali metal salt of a fruit acid, such as sodium tartrate or sodium malate may be used in quantities of from 2% to 5%.

The preferred formula for a liquid dentifrice embodying our discovery and invention comprises:

|  | Per cent |
|---|---|
| Castile soap | 5 –15 |
| 1,2-propanediol | 10 –80 |
| Sodium stearate | 0.1 – 2 |
| Chlorthymol | 0.05– 0.2 |
| Sodium tartrate | 2 – 5 |
| Flavor | 1 – 5 |

Distilled water (carrier), enough to make 100 per cent.
Food color, enough to tint the solution.

The aforesaid "diols" and especially 1,2-propanediol (propylene glycol) are a solvent for the soap and also for mucin and will also soften the impaction of tartar. The distilled water is to dissolve the mild bleach. Chlorthymol has been found to be especially efficacious in the liquid as a promoter for asepsis. The economy in the use of the liquid dentifrice is outstanding, 3 to 6 drops (U. S. P. specifications) suffices for one thorough application.

The liquid is compounded by heating the diols and one-half the distilled water to 80° C. The sodium stearate and castile soap are then added slowly, stirring the solution until both are dissolved. This usually requires about 15 to 30 minutes, and after cooling to room temperature, then the chlorthymol and flavoring oils are added. The sodium tartrate is dissolved in the remaining half of the distilled water and this solution is added to the hydro-glycolic solution slowly while stirring. The color is then added and the final solution chilled and filtered while still cold to obtain a clear solution.

The essential oils are soluble in the aforesaid glycols and exert a stimulating effect on the gums in a much more advantageous manner than they would if held in solution by other means. The liquid dentifrice contains no abrasives which can remove tooth enamel along with the removal of the so-called tartar and other debris residing between the gingival margin and teeth or between the teeth themselves. The dentifrice contains no gums or starches which may breed bacteria like food particles do. The solution remains stable on standing and does not deposit palmitin or other like substance upon standing. The diols are solvents for the soaps recognized by the dental and medical profession, namely, a neutral soap of a vegetable fat or oil, and other emulsification (lathering) agents are usable, for the emulsification of debris and cleaning of the teeth, that are soluble or colloidal in the aforesaid diols aside from the aforesaid vegetable oil soaps or saponaceous substances.

The aforesaid diols do not leave a bad odor or after-taste as do previously known solvents, and they provide a stable clear solution even on standing for protracted periods, thus avoiding the necessity of shaking before using. Even under the most trying climatic conditions the viscosity is only very slightly, if at all, altered.

Many persons can use the same preparation at the same time since the dentifrice is used in liquid drops, thus avoiding touching the container therefor with the tooth brushes. Its viscosity is such, or may be such, that it does not run off the brush but remains on the surface of the brush until the brush is inserted in the mouth in the normal use thereof. The dentifrice contains no abrasives and does not acidify the mouth or remove vital fluids from the same but is weakly alkaline, and does not have the disadvantageous attributes of glycerine or alcoholic solvents, but is non-irritant, non-caustic, non-hygroscopic, and is indifferent to mucous membrane, non-acidic, and prevents the formation of terpeny bodies in the essential oils.

The following formula is an example of the exact percentages we have been using within the general formula above given:

| Castile soap | gms. | 12 |
|---|---|---|
| Sodium stearate | gms. | 0.6 |
| Chlorthymol | gms. | 0.1 |
| 1,2-propanediol | c. c. | 50 |
| Sodium tartrate | gms. | 2 |
| Flavor oil | c. c. | 3 |

Food color, quantity sufficient to tint.
Distilled water, quantity sufficient to make 100 c. c.

The invention as hereinabove set forth is embodied in particular form and manner but may be variously embodied within the scope of the claims hereinafter made.

We claim:

1. An essentially liquid dentifrice comprising a solution of a substantially neutral vegetable soap dissolved in a solvent selected from the group consisting of the propanediols, 1,2-butanediols, 1,3-butanediol, 2,3-butanediol, 1,4-butanediol, 1,2-ethanediol, and 2-methyl-1,3-propanediol as the principal solvent for the soap.

2. An essentially liquid dentifrice comprising a solution of a substantially neutral vegetable soap dissolved in a solvent selected from the group consisting of the propanediols as the principal solvent for the soap.

3. An essentially liquid dentifrice comprising a solution of a substantially neutral vegetable soap dissolved in a solvent comprising 1,2-propanediol as the principal solvent for the soap.

4. An essentially liquid dentifrice comprising a solution of

| Castile soap | gms. | 12 |
|---|---|---|
| 1,2-propanediol | c. c. | 50 |

5. A dentifrice comprising a solution of castile soap dissolved in a solvent selected from the group consisting of the propanediols, 1,2-butanediols, 1,3-butanediol, 2,3-butanediol, 1,4-butanediol, 1,2-ethanediol, and 2-methyl-1,3-propanediol as the principal solvent for the castile soap.

6. A dentifrice comprising a solution of castile soap dissolved in a solvent comprising 1,2-propanediol as the principal solvent for the castile soap.

7. A liquid soap comprising a stable solution of neutral vegetable soap in liquid comprising essentially as the principal solvent for the soap a diol of glycol selected from the group consisting of the propanediols, 1,2-butanediols, 1,3-butanediol, 2,3-butanediol, 1,4-butanediol, 1,2-ethanediol and 2-methyl-1,3-propanediol.

HARRY EISENBERG.
ANTHONY J. ZOLENAS, Jr.